Figure 1:
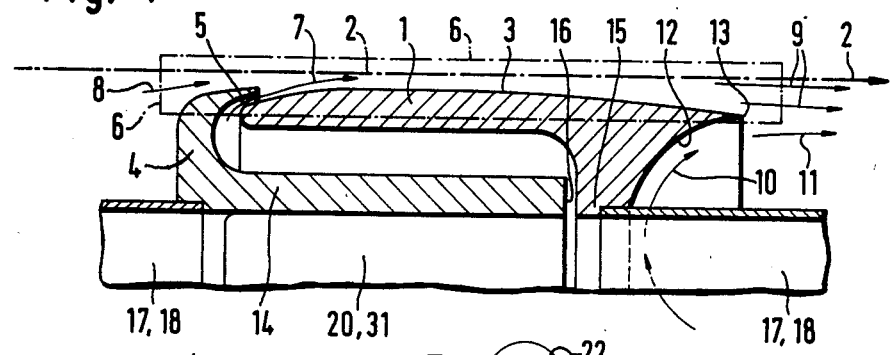

United States Patent [19]

Upmeier

[11] Patent Number: 4,678,417
[45] Date of Patent: Jul. 7, 1987

[54] APPARATUS FOR COOLING TUBULAR PLASTIC FILM EXTRUDED FROM A FILM BLOWING HEAD

[75] Inventor: Hartmut Upmeier, Lengerich of Westphalia, Fed. Rep. of Germany

[73] Assignee: Windmoller & Holscher, Lengrich, Fed. Rep. of Germany

[21] Appl. No.: 857,390

[22] Filed: Apr. 21, 1986

Related U.S. Application Data

[63] Continuation of Ser. No. 594,910, Mar. 29, 1984, abandoned.

[30] Foreign Application Priority Data

Mar. 31, 1983 [DE] Fed. Rep. of Germany ....... 3311932
Sep. 15, 1983 [DE] Fed. Rep. of Germany ....... 3333397

[51] Int. Cl.$^4$ ............................................. B29C 47/36
[52] U.S. Cl. ................... 425/72 R; 264/565; 264/569; 425/326.1
[58] Field of Search ............ 425/72 R, 326.1; 264/237, 565, 569

[56] References Cited

U.S. PATENT DOCUMENTS

| | | | |
|---|---|---|---|
| 4,022,558 | 5/1977 | Herrington | 425/72 R |
| 4,236,884 | 12/1980 | Schott, Jr. | 425/72 R |
| 4,272,231 | 6/1981 | Schott, Jr. | 425/72 R |
| 4,447,387 | 5/1984 | Blakeslee, III et al. | 425/72 R |
| 4,472,343 | 9/1984 | Kawamura et al. | 425/72 R |
| 4,473,527 | 9/1984 | Fujisaki et al. | 264/569 |
| 4,505,657 | 3/1985 | Ikeya | 425/72 R |

FOREIGN PATENT DOCUMENTS

| | | |
|---|---|---|
| 1504607 | 12/1969 | Fed. Rep. of Germany. |
| 2032346 | 1/1972 | Fed. Rep. of Germany. |
| 2256942 | 5/1974 | Fed. Rep. of Germany. |
| 2259732 | 6/1974 | Fed. Rep. of Germany. |
| 2262190 | 7/1974 | Fed. Rep. of Germany. |

Primary Examiner—Jay H. Woo
Assistant Examiner—Timothy W. Heitbrink
Attorney, Agent, or Firm—Fleit, Jacobson, Cohn & Price

[57] ABSTRACT

Cooling apparatus for air-cooling tubular plastic film which has been extruded from a film blowing head comprises spaced apart cooling rings, which in the direction of extrusion succeed the annular extrusion die of the film blowing head and are substantially concentric to the axis of the extruded tubular film and have air-guiding surfaces facing the surface of the tubular film and define annular nozzle gaps for delivering cooling air, which flows in contact with said air-guiding surfaces. The air-guiding surfaces are convexly curved in a longitudinal sectional view of the cooling rings. The nozzle gaps are defined by rings which in the direction of flow of the cooling air precede the cooling rings and which are so arranged that the cooling air discharged from said nozzle gaps flows in a direction which is approximately parallel or at an acute angle to the direction of travel of the tubular film.

13 Claims, 7 Drawing Figures

APPARATUS FOR COOLING TUBULAR PLASTIC FILM EXTRUDED FROM A FILM BLOWING HEAD

This application is a continuation of application Ser. No. 594,910, filed Mar. 29, 1984, now abandoned.

This invention relates to cooling apparatus for air-cooling tubular plastic film which has been extruded from a film blowing head, which apparatus comprises spaced apart cooling rings, which in the direction of extrusion succeed the annular extrusion die of the film blowing head and are substantially concentric to the axis of the extruded tubular film and have air-guiding surfaces facing the surface of the tubular film and define annular nozzle gaps for delivering cooling air, which flows in contact with said air-guiding surfaces.

In cooling apparatus of that kind, which are known from German Patent Publications 20 32 346 and 22 62 190, the air-guiding surfaces consist substantially of cylindrical surfaces of small axial length. Those known cooling apparatus have proved satisfactory in practice and because they permit a higher cooling rate have permitted an increase of the output of the plants for making blown film. But in said known cooling apparatus the rate of flow of cooling air can be increased only up to an upper limit because flow rates above said upper limit would result in disturbing vibration of the film. Said vibration may be so strong that the film is damaged.

For this reason it is an object of the invention to permit an increase of the output of the plants for making blown film in that the known cooling apparatus is improved in such a manner that vibration which may damage the tubular film will be avoided and the vibration will generally be reduced even if the apparatus is operated at a high rate of flow of cooling air and provides a high cooling rate.

This object is accomplished in accordance with the invention in that the air-guiding surfaces are convexly curved in a longitudinal sectional view of the cooling rings and that the nozzle gaps are defined by rings which in the direction of flow of the cooling air precede the cooling rings, and which are so arranged that the cooling air discharged from said nozzle gaps flows in a direction which is approximately parallel or at an acute angle to the direction of travel of the tubular film. In the cooling apparatus according to the invention a venturi tube effect is obtained adjacent to the cooling rings in accordance with the Bernoulli equation, so that the tubular film is sucked and stabilized by the cooling air flowing at high speed. The use of the venturi effect in apparatus for the external cooling of tubular plastic films extruded from film blowing heads is known per se from German Patent Publication 15 04 607 and Laid-open German Applications 22 56 942 and 22 59 732. But in said known external cooling apparatus the cooling air is blown through a venturi-like shell tube, which surrounds the tubular film, so that the cooling rate cannot be appreciably increased without a destabilization of the tubular film.

In accordance with a preferred further feature within the scope of the invention the air-guiding surfaces of the cooling rings have a shape which is similar to the suction side of airfoils, and the rings defining the nozzle gaps are similar to auxiliary airfoils known as slats. Because the ring which together with the cooling ring defines the nozzle gap resembles a slat, a flow having a higher energy content can be supplied through the nozzle gap to the airfoil-like air-guiding surfaces so that the boundary layer on the suction side will resist even a relatively high pressure rise without a risk of a separation of flow. The blowing air stream discharged from the nozzle gap produces an injector effect so that additional cooling air is sucked over the slat.

The rear side of each cooling ring is desirably arcuate adjacent to its trailing edge to conform approximately to the trailing vortex so that said rear side and the trailing edge of the air-guiding surface form either sharp or rounded annular edges. In case of such a design the suction air is deflected into the general direction of flow without turbulence and assists the cooling air jet which has flown beyond the air-guiding surfaces.

The cooling air rings and the rings which define the annular nozzle orifices may be arranged on a plurality of levels on the inside and/or outside of the tubular film. If cooling rings are provided on both sides of the tubular film, they will desirably be staggered so that each cooling ring on one side is disposed approximately midway between two cooling rings on the other side.

The length of the cooling rings may be relatively small. The spacing of the cooling rings on each side is approximately twice to three times the axial length of the cooling ring.

If the tubular films extruded from the film blowing head have only a small wall thickness, a relatively low blowing pressure will be sufficient to inflate said tubular films so as to effect an orientation of the film material.

If a relatively high blowing pressure is required to inflate the extruded tubular film, e.g., because the latter has a relatively large wall thickness, then that higher inflation pressure will be effective also in that portion of the cooling path which contains the throat of the tubular film. Such higher internal pressure may urge the throat of the tubular film against the cooling rings which surround said throat. In that case the cooling air discharged from the nozzle gaps would be throttled and reversed to flow over the rear sides of the rings which define the nozzle gaps. The cooling and guiding effect will thus be heavily disturbed if a relatively high inflating pressure is rearwardly applied to the throat of the tubular film, so that the latter is forced through the cushion of cooling air which is disposed between said throat and the surrounding cooling ring.

In order to avoid such undesired phenomena a further feature within the scope of the invention resides in that at least those of the convex or airfoil-like, curved cooling rings which are disposed on the outside of the tubular film are arranged in pairs in mirror symmetry with respect to a radial plane and that those wall portions which define the nozzle gaps for blowing air against the cooling rings are disposed in the radial gap between adjacent cooling rings. From the nozzle gaps the air flows toward both sides so that the air cushion which is formed has a higher stability and the higher inflating pressure applied to effect an orientation of the tubular film cannot react on the throat of the tubular film in such a manner that the film is forced against the external cooling rings so as to throttle or suppress the supply of cooling air to said external cooling rings.

A higher inflation pressure will produce undesirable results, particularly in the processing of plastics which have a low stability and exhibit a pronounced tendency to swell as they leave the annular extrusion die. Particularly, when only internal cooling rings are used, a relatively high inflating pressure will tend to urge the throat of the tubular film away from the internal cooling rings so that the throat of the tubular film may be inflated like a balloon at its weakest point, closely above the extrusion die, where the molten material is at the highest temperature, and the throat of the tubular film may even burst in that region.

For this reason a further feature within the scope of the invention resides in that a conical expanding structure is disposed between the annular extrusion die and the first cooling ring and an annular nozzle gap for supplying lubricating air is provided at the lower end of said expanding structure. Particularly if said expanding structure has generatrices which are similar to airfoil sections, said expanding structure will exert a stabilizing suction force on the throat of the tubular film.

Further advantageous features within the scope of the invention are described in the dependent claims.

An illustrative embodiment of the invention will now be explained more in detail with reference to the drawing, in which:

FIG. 1 is a longitudinal sectional view showing one side of an airfoil-shaped cooling ring and a slatlike ring which defines an annular nozzle gap.

Figure 2:
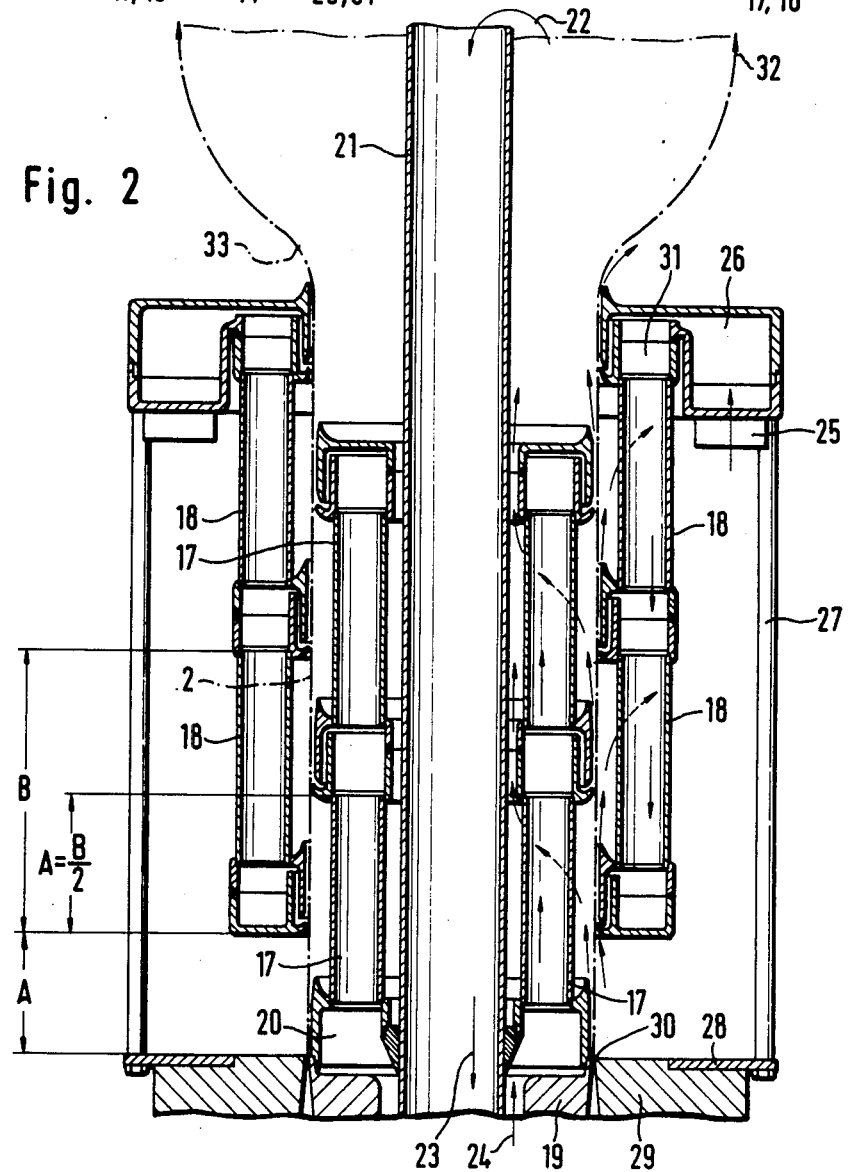
Figure 3:
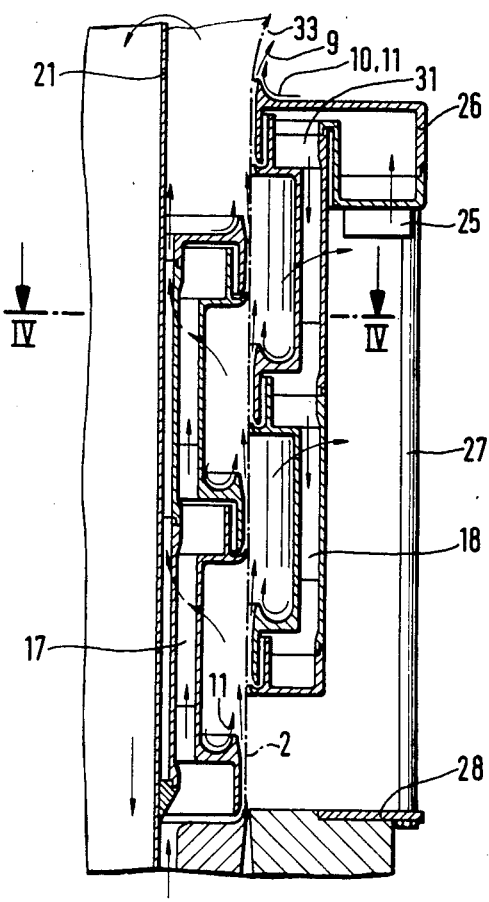
Figure 4:
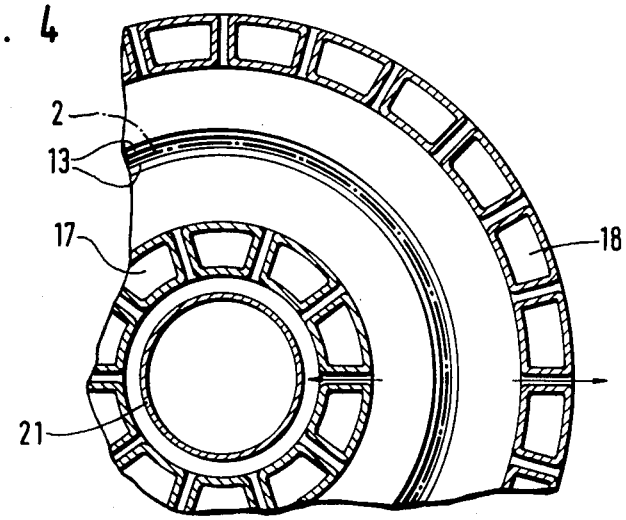
Figures 5, 6:
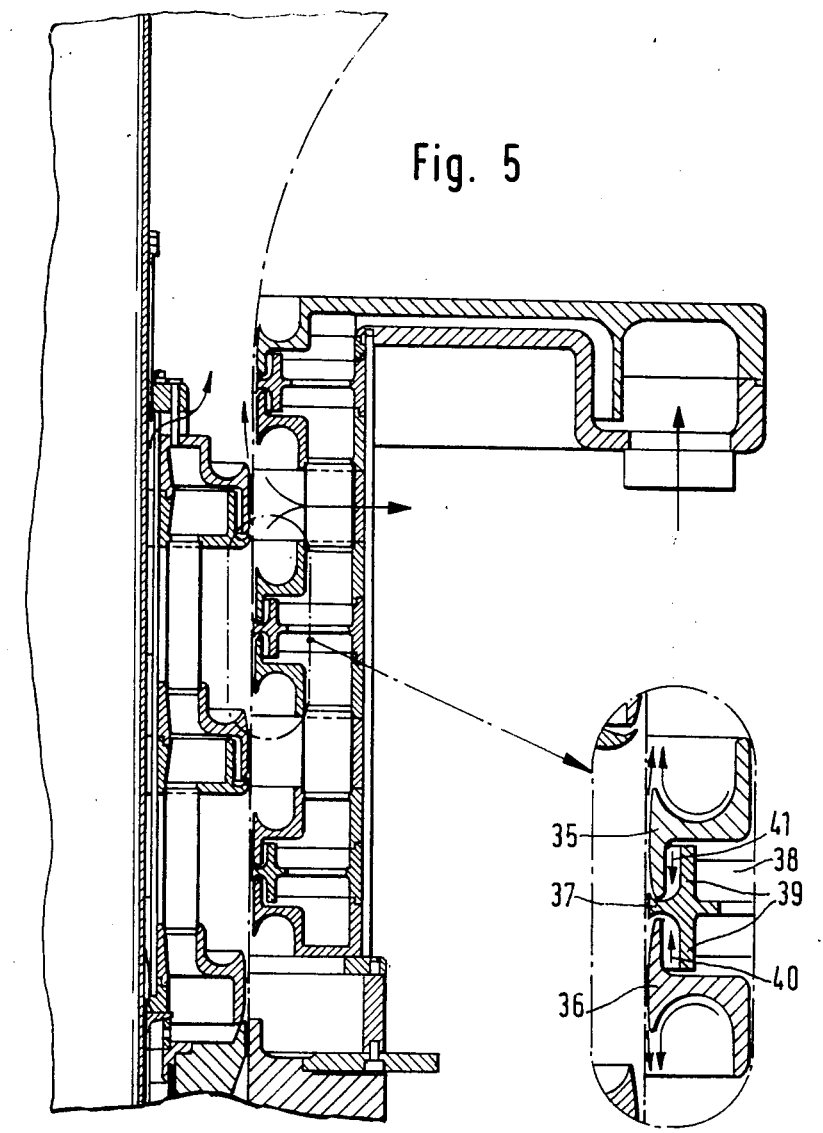
Figure 7:
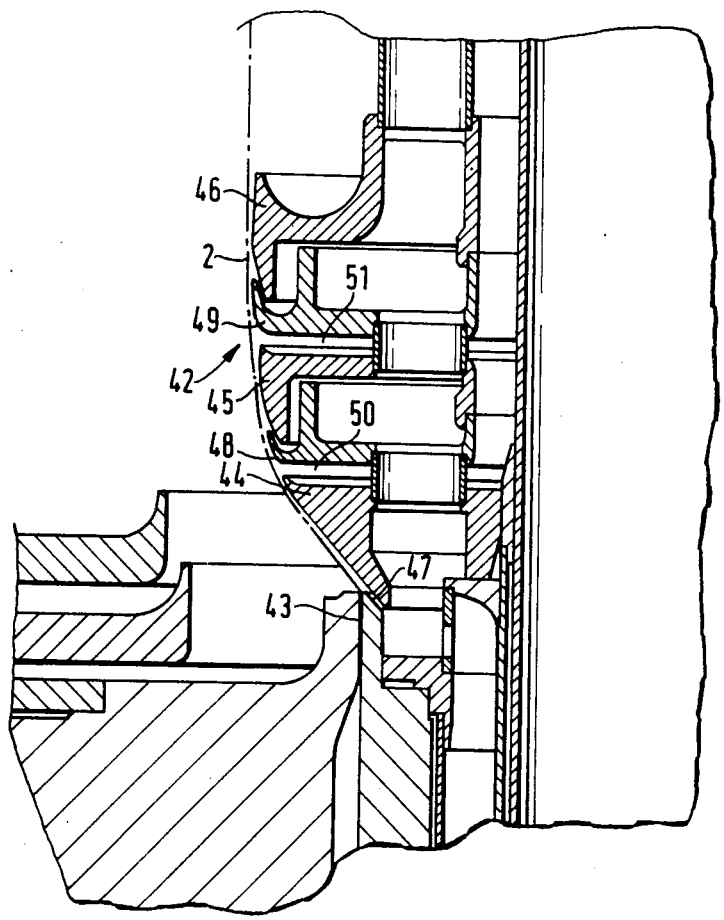

FIG. 2 is a longitudinal sectional view showing the cooling device with cooling rings arranged on a plurality of levels on the inside and outside of the tubular film, FIG. 3 is an enlarged fragmentary view showing a portion of the cooling apparatus of FIG. 2 which has been modified by the use of cast rings, FIG. 4 is a sectional view taken on line IV—IV in FIG. 3, FIG. 5 is a longitudinal sectional view which is similar to FIG. 5 and shows a different embodiment of the cooling apparatus, FIG. 6 is an enlarged fragmentary view showing a portion of FIG. 5, and FIG. 7 is a longitudinal sectional view showing an expanding structure which consists of cooling rings.

FIG. 1 is a longitudinal sectional view showing part of a cooling ring 1, which on one side, which faces the inside or outside surface of the extruded tubular film 2, has an air-guiding surface 3. That surface is shaped like the suction side of an airfoil. In the direction of flow of the cooling air the cooling ring 1 is preceded by a ring 4, which has the shape of an auxiliary airfoil known as a slat and which overlaps the leading end of the cooling ring 1 and together with the latter defines an annular gap 5. The annular gap 5 extends in the direction in which the air flows over the airfoil-like air-guiding surface of the cooling ring 1, i.e., at an acute angle to the adjacent surface 2 of the film 2. The cooling portions of the cooling ring 1 and the slatlike ring 4 are indicated by the dash-dot boundary line 6 and correspond substantially to the upper surface of an airfoil provided with a Junkers slat.

The main air stream is blown through the gap 5 between the slatlike ring 4 and the cooling ring 1 and owing to its high speed exerts a suction force, which stabilizes the tubular film 2 that is to be cooled. On the side facing the tubular film 2, the cooling ring 1 and the slatlike ring 4 together constitute an annular wing.

The air jet 7 produces an injector effect, by which an additional air stream 8 assisting the cooling and the air-directing action is sucked over the slatlike ring 4.

Owing to the airfoil configuration which has been adopted, the cooling air leaves the cooling ring 1 in the direction indicated by the arrows 9 with negligibly small turbulence at the trailing end of the air-guiding surface 3. The air 10 which is under a negative pressure on the airfoil-like underside is deflected into the direction of flow 9 of the cooling air to form an air jet 11 assisting the flow of cooling air. Near the trailing end of the cooling ring 1, the underside 12 of said ring 1 is arcuately curved and together with the trailing end of the air-guiding surface 3 constitutes an annular edge 13.

The slatlike ring 4 is constituted by a flange mounted on a tubular member 14, which in accordance with FIG. 1 extends into the cooling ring 1 so that an annular space is defined between the inside peripheral surface of the cooling ring 1 and the outside peripheral surface of the tubular member 14. Behind said tubular member 14 the cooling ring 1 is provided with an inwardly directed annular portion 15, which defines a flow passage 16 with the tubular member 14. Pipes 17 and 18 for supplying cooling air are connected to the tubular member 14 and the annular portion 15, respectively.

FIG. 2 shows a plurality of cooling rings arranged on a plurality of levels. The cooling rings disposed on the inside of the tubular film are staggered with respect to those on the outside.

The first cooling ring is disposed on the inside of the tubular film and closely succeeds the inner ring 19 of the extrusion die. The nozzle gap is defined by the cooling ring and the raised lip of the inner ring of the extrusion die. The annular space 20 on the inside of the first cooling ring is closed except for an air inlet, the nozzle gap 5 and the pipes 17. From the annular space 20 on the inside of the first cooling ring, cooling air is conducted in the pipes 17 into the annular space 20 on the inside of the second inner cooling ring. From that annular space 20 another part of the cooling air is discharged through the gap 5 defined in FIG. 1. Beyond the annular space 20 on the inside of the second inner cooling ring the air is conducted in the pipes 17 into the annular space 20 on the inside of the last inner cooling ring. From that annular space 20, cooling air is discharged in the manner described hereinbefore. Gaps are provided between the pipes 17 and between those inner cooling rings which succeed the first cooling ring and the central pipe 21. Through these gaps the cooling air leaving the cooling and air-guiding surfaces can enter the tubular film. The spent cooling air then enters the central pipe 21 in the direction indicated by the arrow 22 and is sucked through the central pipe in the direction indicated by the arrow 23.

Fresh cooling air is supplied to the inner cooling rings in the direction of the arrow 24 through the annular space which surrounds the central pipe 21.

Cooling rings are also provided on the outside of the tubular film as shown and are supplied with cooling air through the pipes 25 and the annular duct 26, which is secured to supporting rods 27. The latter are supported by feet 28 on the outer ring 29 of the die 30.

The annular duct 26 opens through an annular gap into the annular space 31 in the interior of the uppermost outer cooling ring. That annular space is connected through pipes 18 to the lower outer cooling rings. Each outer cooling ring is designed as is apparent from FIG. 1 and has a closed internal annular space for distributing the cooling air to be discharged. That annular space is not shown in FIG. 1.

The cooling rings on the inside and outside of the tubular film are disposed on a plurality of levels and the internal rings and external rings are staggered by one half of their axial spacing. The lowermost outer cooling ring is spaced from the outer die ring 29 by a distance A, which is one-half of the cooling ring spacing B. This staggered arrangement facilitates the access to the die 30 for cleaning. The outer cooling rings are secured to and centered on the outer die ring 29 by the supporting ring 28. The cooling rings may be arranged on a plurality of levels only on the outside of the tubular film or on the inside thereof or on both sides, as is shown in FIG. 2. The strongest cooling effect will be produced in the arrangement shown in FIG. 2, in which the tubular film is supported in undulating shape on the consecutive inner and outer cooling rings and is sucked by said rings so that the support of the tubular film on its inside and outside in alternation will ensure a very steady movement of the tubular film in conjunction with an intense cooling, although certain length portions of the tubular film are left unsupported between the cooling rings.

The molten plastic material coming from an extruder, not shown, as shaped by the die 30 to form a tubular film 2, which has a constant diameter as long as it moves past the cooling rings disposed on a plurality of levels. By means of the cooling rings the blown tubular film must be cooled to such a degree that it will be expanded just to the desired diameter 32 of the tubular film and will then solidify. Owing to the reduced temperature of the molten material in the transition zone 33 the strength of the film will increase in that zone. In known film-blowing plants the internal pressure in the tubular film is too high relative to the external pressure so that a spontaneous orientation of the molten material takes place without an appreciable increase in strength.

The smallest cooling effect is produced by a multi-level internal cooling arrangement; this can be assisted by a conventional outer cooling ring lying on the outer die ring 29.

The cooling effect will be further increased in conjunction with a strength increase by a provision of cooling rings provided on the outside of the tubular film on a plurality of levels because owing to the support of the tubular film on the outside, the inflating pressure may be higher than is usual.

When the plant is to be started, the outer cooling rings together with their supporting rods 27 and the supporting ring 28 may be lifted so that the leading end of the tubular film can be threaded more easily over the inner cooling rings. Thereafter the outer cooling rings are lowered to their operative position.

FIGS. 3 and 4 show an embodiment with cast inner and outer cooling rings. The several parts consist of castings, which are properly machined and then assembled by being placed one on the other as shown.

The connecting pipes 17, 18 are sector-shaped in cross-section and are arranged approximately in mirror symmetry to the wall of the extruded tubular film.

Gaps are left between the sector-shaped pipes and permit the heated air to flow out into the open air or into the tubular film.

The use of cast connecting pipes permits a particularly desirable design of the trailing edges 13 so that the back-flowing cooling air can be mixed with the cooling air leaving the air-guiding surfaces without a disturbing turbulence.

The embodiment shown in FIG. 5 differs from the one shown in FIGS. 2 and 3 essentially in that two convex or airfoil-like cooling rings 35, 36 are arranged in mirror symmetry to define a radial gap, through which cooling air is blown against the cooling rings. A ring 37 which is T-shaped in cross-section is disposed in the gap between the cooling rings 35, 36. The annular flange of the T-section ring 37 overlaps the confronting edges of the cooling rings 35, 36 on the side facing the tubular film. The portions of the ring 37 between its flange and its leg, which extends into the gap, are rounded to form surfaces which together with the leading edges of the cooling rings define annular nozzle gaps, which define flow paths at an acute angle to the tubular film. In the annular chamber 38 for supplying cooling air, the radial leg of the T-section ring 37 is provided at its free end with an axial ring 39, which protrudes from the ring 37 on both sides to define axial supply passages 40, 41 for the cooling air between those portions of the ring 39 that are disposed on opposite sides of the leg and the rear sides of the cooling rings 35, 36.

FIG. 7 shows a generally conical or parabolic expanding structure 42, which serves to stabilize the throat of the tubular film 2 as soon as it has been extruded from the annular extrusion die 43. The expanding structure 42 is composed of cooling rings 44, 45, 46 having generatrices which are similar to airfoil sections. Cooling air is blown against the lowermost cooling ring 44 through gap 47. The succeeding cooling rings 45, 46 are provided with slatlike rings 48, 49, which together with the cooling rings 45, 46 define nozzle gaps, which constitute flow paths extending at an acute angle to the tubular film 2. Radial gaps 50, 51 for removing the spent cooling air are defined between the cooling rings and the slatlike rings.

What is claimed is:

1. Cooling apparatus for air-cooling tubular plastic film which has been extruded from a film blowing head including an annular extrusion die, which apparatus comprises: axially spaced successive cooling rings, which in the direction of extrusion are downstream of the annular extrusion die of the film blowing head and are substantially concentric to a longitudinal axis of the extruded tubular film, the cooling rings including first rings having first convex annular air-guiding surfaces adjacent to and facing a surface of the tubular film and defining an annular flow passage with the film for conveying cooling air which flows in contact with said air-guiding surfaces and with the film, the air-guiding surfaces being convexly curved along substantially their entire length in a longitudinal sectional view of the first rings to define with the surface of the film an annular flow passage that converges and then diverges in an axial direction, and nozzle gaps defined by second rings positioned upstream of and spaced from the first rings and which are so arranged that a main cooling air flow discharged from said nozzle gaps flows into the converging portion of said annular flow passage along the convexly curved air-guiding surfaces of said first rings and along the surface of the tubular film and approximately parallel to and in the same direction as the direction of travel of the tubular film, said nozzle gaps positioned at an outlet of a converging annular passageway defined by said first and second rings, said second rings having second convex annular air-guiding surfaces adjacent to and facing the surface of the film and over which an induced flow of ambient air passes as a result of an injection effect to provide additional cooling air that flows in the same direction as the direction of travel of the tubular film, and said first rings having an annular trailing edge defined by the junction of said first annular air-guiding surface and a second surface of said first ring over which an additional flow of ambient air is induced by the main cooling air flow to flow in the direction of travel of the tubular film.

2. Cooling apparatus according to claim 1, wherein an opposite side of each first ring opposite to the convexly curved air-guiding surface is arcuate adjacent to its trailing edge to conform approximately to a trailing vortex so that said opposite side and the trailing edge of the air-guiding surface meet to define annular edges.

3. Cooling apparatus according to claim 1, wherein successive axially spaced cooling rings are interconnected by substantially axially extending pipes for supplying cooling air and said pipes have openings leading into said nozzle gaps defined by the first rings and the second rings.

4. Cooling apparatus according to claim 3, wherein the cooling rings are disposed on the inside and outside of the tubular film and are staggered by one-half of the spacing between successive cooling rings.

5. Cooling apparatus according to claim 3, wherein the spacing of successive cooling rings on one side of the tubular film is about twice to three times the axial length of a cooling ring.

6. Cooling apparatus according to claim 3, wherein the cooling rings are disposed on the outside of the tubular film and carried by a holding structure that is movable axially outwardly of the extrusion die.

7. Cooling apparatus according to claim 3, wherein the first rings, the second rings defining nozzle gaps with the first rings, and the axially extending pipes are formed from castings which are adapted to be superimposed and fitted together.

8. Cooling apparatus according to claim 1, wherein two convex first rings are arranged in mirror symmetry with respect to a radial plane passing through the tubular film and an axial gap between the first rings contains wall portions defining nozzle gaps for conducting cooling air to be blown against the cooling rings and the tubular film.

9. Cooling apparatus according to claim 8, wherein the wall portions which together with the first rings define the nozzle gaps include an approximately T-shaped structure in cross-section having an annular flange which overlaps confronting edge portions of the pair of first rings on the side facing the tubular film, and wherein a leg of said T-shaped ring extends radially and centrally through the axial gap between the first rings, and said flange and leg extend at right angles to each other and form a rounded junction.

10. Cooling apparatus according to claim 8, wherein the cooling rings arranged in mirror symmetry are disposed on the outside of the tubular film.

11. Cooling apparatus according to claim 1, wherein a conical expanding structure is disposed interiorly of the tubular film and between the annular extrusion die and a cooling ring adjacent to said die, and an annular nozzle gap for discharging lubricating air is provided at an end of said expanding structure adjacent the extrusion die.

12. Cooling apparatus according to claim 11, wherein the expanding structure has generatrices which are similar to an airfoil section.

13. Cooling apparatus according to claim 11, wherein the expanding structure includes substantially conical third rings having generatrices which are similar to airfoil sections and cooling air is blown against said third rings through nozzle gaps defined by fourth rings positioned upstream of and spaced from said third rings.

* * * * *